United States Patent
Hsu et al.

(10) Patent No.: US 8,364,305 B2
(45) Date of Patent: Jan. 29, 2013

(54) APPARATUS AND METHOD FOR TUNING CONTROL PARAMETER

(75) Inventors: Chih-Yuan Hsu, Dashu Township, Kaohsiung County (TW); Hsin-Chuan Su, Mailiao Township, Yunlin County (TW); Chin-Chu Sun, Taichung (TW); Shih-Chang Liang, Changhua (TW); Wan-Kun Chang, Longjing Township, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 273 days.

(21) Appl. No.: 12/855,618

(22) Filed: Aug. 12, 2010

(65) Prior Publication Data

US 2011/0251710 A1  Oct. 13, 2011

(30) Foreign Application Priority Data

Apr. 13, 2010  (TW) .............................. 99111515 A

(51) Int. Cl.
 *G06F 19/00* (2011.01)
(52) U.S. Cl. .................... 700/180; 700/173; 702/151
(58) Field of Classification Search .......... 700/177–180, 700/173; 702/151
See application file for complete search history.

(56) References Cited

U.S. PATENT DOCUMENTS

| 5,815,400 | A * | 9/1998 | Hirai et al. | 700/173 |
|---|---|---|---|---|
| 6,298,278 | B1 * | 10/2001 | Pierse | 700/174 |
| 6,597,142 | B2 * | 7/2003 | Shibukawa et al. | 318/569 |
| 6,957,121 | B2 * | 10/2005 | Lottgen et al. | 700/180 |
| 7,127,310 | B1 * | 10/2006 | Barto et al. | 700/100 |
| 7,421,321 | B2 * | 9/2008 | Breed et al. | 701/33.6 |
| 7,813,993 | B1 * | 10/2010 | Barto et al. | 705/37 |
| 2003/0033105 | A1 * | 2/2003 | Yutkowitz | 702/105 |
| 2003/0036868 | A1 * | 2/2003 | Yutkowitz | 702/105 |
| 2003/0045964 | A1 * | 3/2003 | Lottgen et al. | 700/180 |
| 2003/0083772 | A1 * | 5/2003 | Shiba et al. | 700/180 |
| 2004/0193385 | A1 * | 9/2004 | Yutkowitz | 702/151 |
| 2005/0192727 | A1 * | 9/2005 | Shostak et al. | 701/37 |
| 2006/0025897 | A1 * | 2/2006 | Shostak et al. | 701/1 |
| 2008/0033591 | A1 * | 2/2008 | Lankalapalli et al. | 700/173 |

\* cited by examiner

*Primary Examiner* — Mohammad Ali
*Assistant Examiner* — Anthony Whittington
(74) *Attorney, Agent, or Firm* — McClure, Qualey & Rodack, LLP

(57) ABSTRACT

An apparatus and a method for tuning control parameters are disclosed. The apparatus includes a parameter database, a user interface, a processing unit and a control unit. The parameter database stores several control parameter sets, which are classified into several data groups respectively corresponding to several total machining points. The user interface is for selecting one of the total machining points, and distributing the selected total machining point to at least one machining item to generate distribution data of points. The user interface is further for inputting embryo data. The processing unit selects one of the control parameter sets corresponding to the distribution data of points and the embryo data from the parameter database. The control unit controls a machine tool according to the corresponding one of the control parameter sets.

8 Claims, 4 Drawing Sheets

APPARATUS AND METHOD FOR TUNING CONTROL PARAMETER

This application claims the benefit of Taiwan application Serial No. 99111515, filed Apr. 13, 2010, the subject matter of which is incorporated herein by reference.

TECHNICAL FIELD

The disclosure relates in general to an apparatus and a method for tuning control parameters, and more particularly to an apparatus and a method for tuning control parameters in a machine tool.

BACKGROUND

In the field of machine tools, the settings of the machining parameters, such as the acceleration, the rotating speed, the maximum feed rate, the servo parameter and the like, tend to affect the finally result. However, how to set the parameters often accompanies with the knowledge of the complicated control system or needs many years of accumulated machining experience. Such the operation method is relatively difficult for the beginner who operates the machine tool, and the improper operation tends to damage the machine. This also increases the learning threshold in the machining field, and the machining experience inheritance cannot be easily made.

Among the frequently used controllers, the machining parameters for the three-axis controller include about 5000 sets of predefined values, and the machining parameters for the five-axes controller include about 12,000 sets of predefined values. It is very difficult for the ordinary user to decide so many sets of parameters. In view of the factor of the complicated setting of the machining parameters, the machine tools are usually tuned and calibrated by the computer numerical control (CNC) before being shipped out. Even so, the client still needs to tune the parameters after the machine tool is shipped out. To overcome these drawbacks, some manufacturers install more than one predetermined tuning options, which may be used later, in advance. In the field of the cutting process, the manufacturers care the following three factors, including the machining precision effect, the machining time and the surface roughness. If too many parameters have to be set, the time of preparing the machining process is too long, and the production efficiency is lowered.

SUMMARY OF THE DISCLOSURE

The disclosure is directed to an apparatus and a method for tuning control parameters, wherein the technological threshold of the operator of using the machine tool can be lowered, and the machining experience inheritance and the machining efficiency can be advantageously enhanced.

According to a first aspect of the present disclosure, an apparatus for tuning control parameters is provided. The apparatus includes a parameter database, a user interface, a processing unit and a control unit. The parameter database stores a plurality of control parameter sets, which is classified into a plurality of data groups respectively corresponding to a plurality of total machining points. The user interface selects one of the total machining points, is for distributing the selected one of the total machining points to at least one machining item to generate distribution data of points, and is further for inputting embryo data. The processing unit selects one of the control parameter sets corresponding to the distribution data of points and the embryo data from the parameter database. The control unit controls a machine tool according to the corresponding one of the control parameter sets.

According to a second aspect of the present disclosure, a method for tuning control parameters in a machine tool is provided. The method includes the following steps. First, a parameter database, which stores a plurality of control parameter sets classified into a plurality of data groups respectively corresponding to a plurality of total machining points, is selected. Next, one of the total machining points is selected. Then, the selected one of the total machining points is distributed to at least one machining item to generate distribution data of points, and embryo data are inputted. Next, one of the control parameter sets corresponding to the distribution data of points and the embryo data from the parameter database is selected. Then, a machine tool is controlled according to the corresponding one of the control parameter sets.

The disclosure will become apparent from the following detailed description of the preferred but non-limiting embodiments. The following description is made with reference to the accompanying drawings.

DETAILED DESCRIPTION OF THE DISCLOSURE

Figure 1:
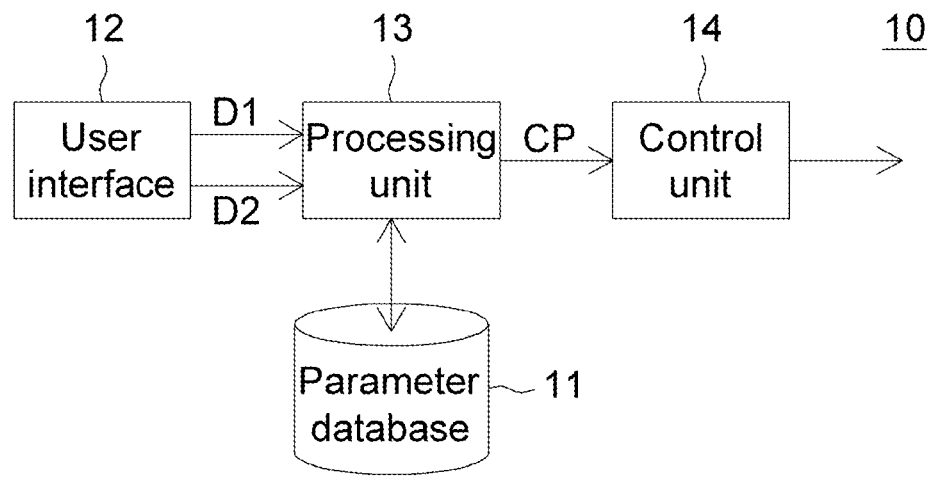
FIG. 1 is a schematic illustration showing an apparatus for tuning control parameters.
Figure 2:
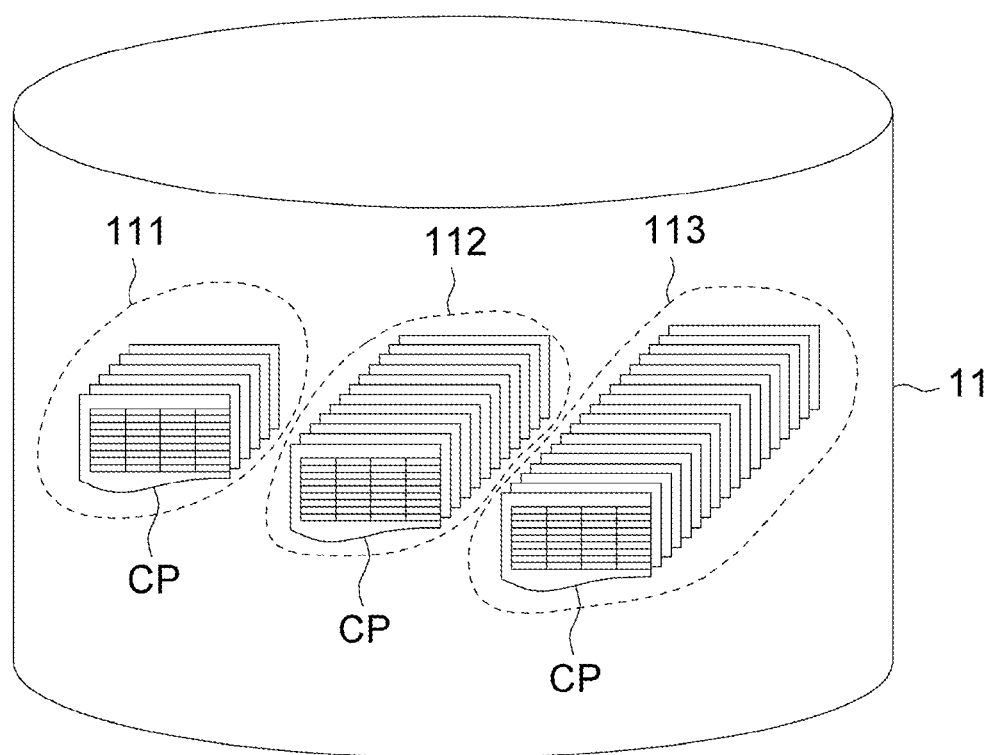
FIG. 2 is a schematic illustration showing a parameter database.

FIG. 1 is a schematic illustration showing an apparatus 10 for tuning control parameters. FIG. 2 is a schematic illustration showing a parameter database. Referring to FIGS. 1 and 2, the apparatus 10 for tuning control parameters includes a parameter database 11, a user interface 12, a processing unit 13 and a control unit 14. The parameter database 11 stores several control parameter sets CP, each of which is obtained according to the theoretical derivations of the experts and the long-term working experience optimization of the operators, for example, and is thus advantageous to the machining experience inheritance. The control parameter sets CP are classified into a data group 111, a data group 112 and a data group 113, which respectively correspond to different total machining points. For example, the data group 111 corresponds to total machining points of ten points; the data group 112 corresponds to total machining points of twenty points; and the data group 113 corresponds to total machining points of thirty points. For the sake of illustration, three data groups are described as an example. However, the number of the data groups may be flexibly tuned according to the actual application requirement.

For example, the user interface 12 is a display, a keyboard or a mouse. The user interface 12 is for selecting the total machining points, and the number of the total machining points corresponds to different user levels. When the user has more machining experience, more machining points can be selected to provide more diversified machining choices. For example, if the user is a beginner lacking of the machining experience, then ten machining points may be selected. If the user had some machining experience, then twenty machining points may be selected. If the user is a highly experienced master, then thirty machining points may be selected.

The user interface 12 further distributes the selected total machining points to one machining item or several machining items to generate distribution data of points D1. The machining items comprise, for example, precision item, machining time item and surface roughness item. For example, when ten machining points are selected, total machining points of ten points may be distributed to the precision, the machining time and the surface roughness through the user interface 12 to generate the distribution data of points D1. The user interface 12 further inputs embryo data D2, which include, for example, a workpiece material and the shape and dimension of the embryo.

The processing unit 13 selects one control parameter set CP corresponding to the distribution data of points D1 and the embryo data D2 from the parameter database 11. The control unit 14 controls a machine tool according to the control parameter set CP, selected by the processing unit 13.

Figure 3:
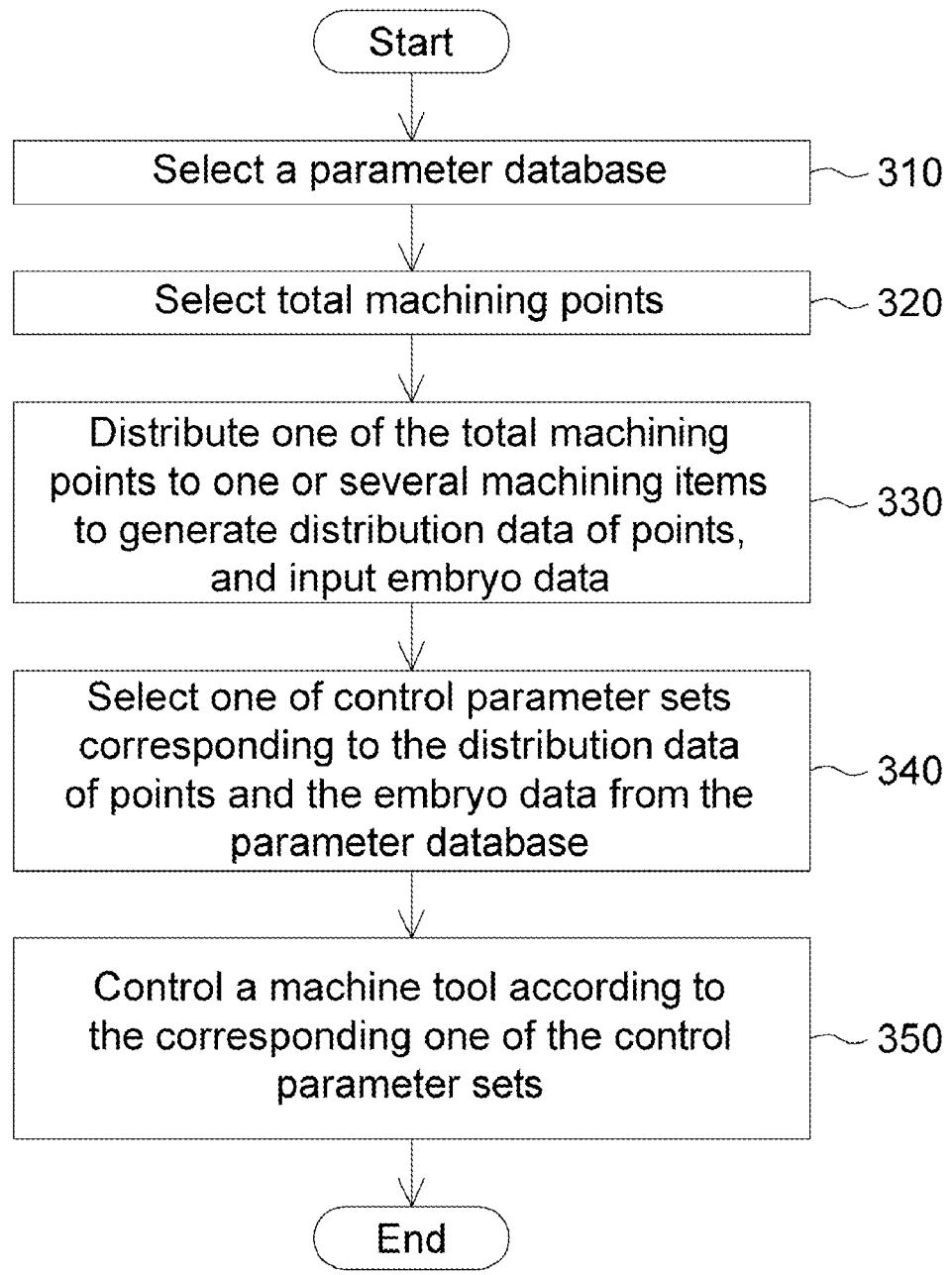
FIG. 3 is a flow chart showing a method for tuning the control parameters.

FIG. 3 is a flow chart showing a method for tuning the control parameters. As shown in FIG. 3, the method may be applied to the apparatus for tuning the control parameters, and includes the following steps. First, as shown in step 310, the parameter database 11, which stores several control parameter sets CP, is selected. The control parameter sets CP are classified into the data groups 111 to 113, which respectively correspond to different total machining points.

Next, as shown in step 320, the total machining points are selected through the user interface 12, wherein the number of the machining points corresponds to different user levels. When the user has more machining experience, more machining points can be selected to provide more diversified machining choices. For example, if the user is a beginner lacking of the machining experience, then ten machining points may be selected. If the user had some machining experience, then twenty machining points may be selected. If the user is a highly experienced master, then thirty machining points may be selected.

Then, as shown in step 330, the total machining points are distributed, through the user interface 12, to one machining item or multiple machining items to generate the distribution data of points D1, and the embryo data D2 are inputted through the user interface 12. Then, as shown in step 340, the processing unit 13 selects one control parameter set CP corresponding to the distribution data of points D1 and the embryo data D2 from the parameter database 11. Next, as shown in step 350, the control unit 14 controls the machine tool according to the control parameter set CP selected by the processing unit 13.

Figure 4:
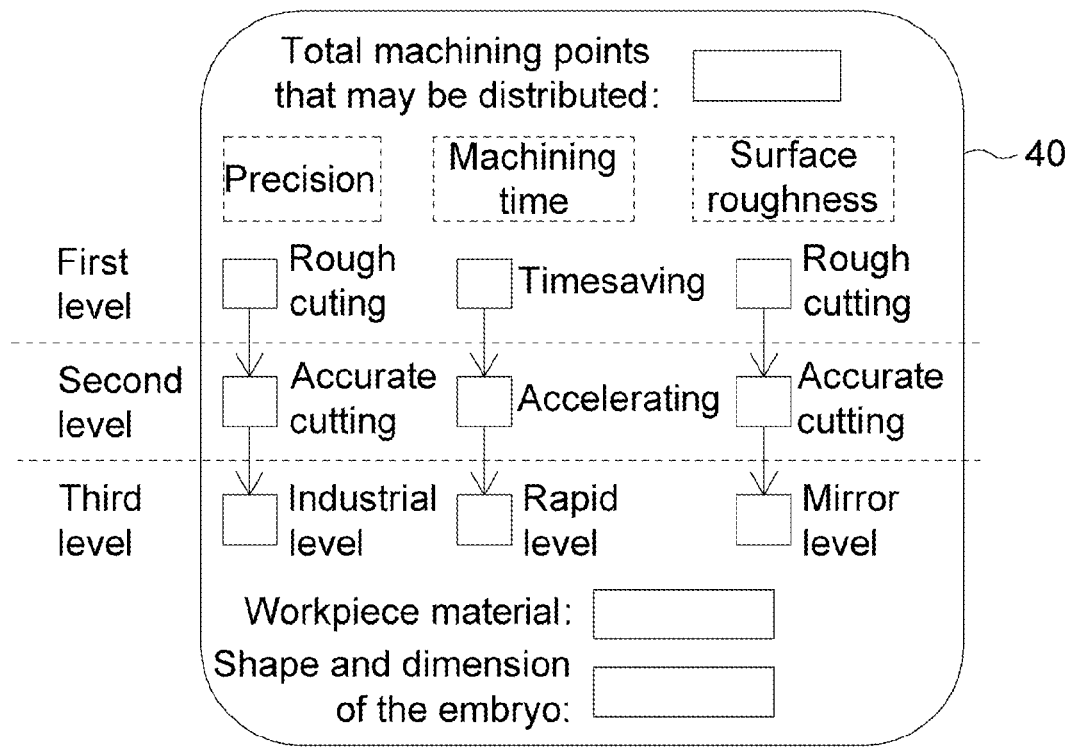
FIG. 4 shows an operation interface provided by the user interface.

FIG. 4 shows an operation interface provided by the user interface. As shown in FIG. 4, the user interface 12 provides an operation interface 40, for example. The operation interface 40 includes the total machining points, which may be distributed, the precision, the machining time, the surface roughness, the workpiece material and the shape and dimension of the embryo. The number of the total machining points, which may be distributed, corresponds to the user levels described hereinabove. The user possessing the more machining experience has the more total machining points, which may be distributed. The user can input the total machining points, which may be distributed, the workpiece material and the shape and dimension of the embryo through the operation interface 40, and can distribute the total machining points to the precision, the machining time and the surface roughness through the operation interface 40 to generate the distribution data of points D1. The operation interface 40 can significantly decrease the technological threshold of the operator using the machine. The options of the workpiece material and the shape and dimension of the embryo in the operation interface 40 may be selected by the user conveniently through a pulldown menu. In addition, the operation of the operation interface 40 is simple and it is unnecessary to set too many parameters, so the process preparing time can be shortened and the machining efficiency can be enhanced.

It is to be noted that each of the precision, the machining time and the surface roughness is classified into a first level, a second level and a third level. The first to third levels of the precision are respectively the rough cutting, accurate cutting and industrial level. The first to third levels of the machining time are respectively timesaving, accelerating and rapid level. The first to third levels of the surface roughness are respectively the rough cutting, accurate cutting and mirror level. If there are total machining points of N points, which can be distributed, then the upper limit of distributed points of the first level is equal to $N/2$, the upper limit of distributed points of the second level is equal to $(N/2)-1$, and the upper limit of distributed points of the third level is equal to 1. For example, if there are total machining points of ten points, which may be distributed, then the upper limit of distributed points of the first level is equal to 5, the upper limit of distributed points of the second level is equal to 4, and the upper limit of distributed points of the third level is equal to 1.

In addition, the distributed point of the third level of any one of the three machining items, comprising the precision item, machining time item and surface roughness item, is equal to 1, then the points of the second level of the machining item are automatically distributed as $(N/2)-1$, and the points of the first level of the machining item are automatically distributed as $N/2$. For example, if there are total machining points of ten points, which may be distributed, and when the distributed point of the third level of the precision is equal to 1, then the points of the second level of the precision are automatically distributed as 4, and the points of the first level of the precision are automatically distributed as 5.

According to the rules regarding the upper limit of distributed points of the first to third levels, the parameter database 11 has the excellent extensibility and is advantageous to the expansion and maintenance of the subsequent data group.

Figure 5:
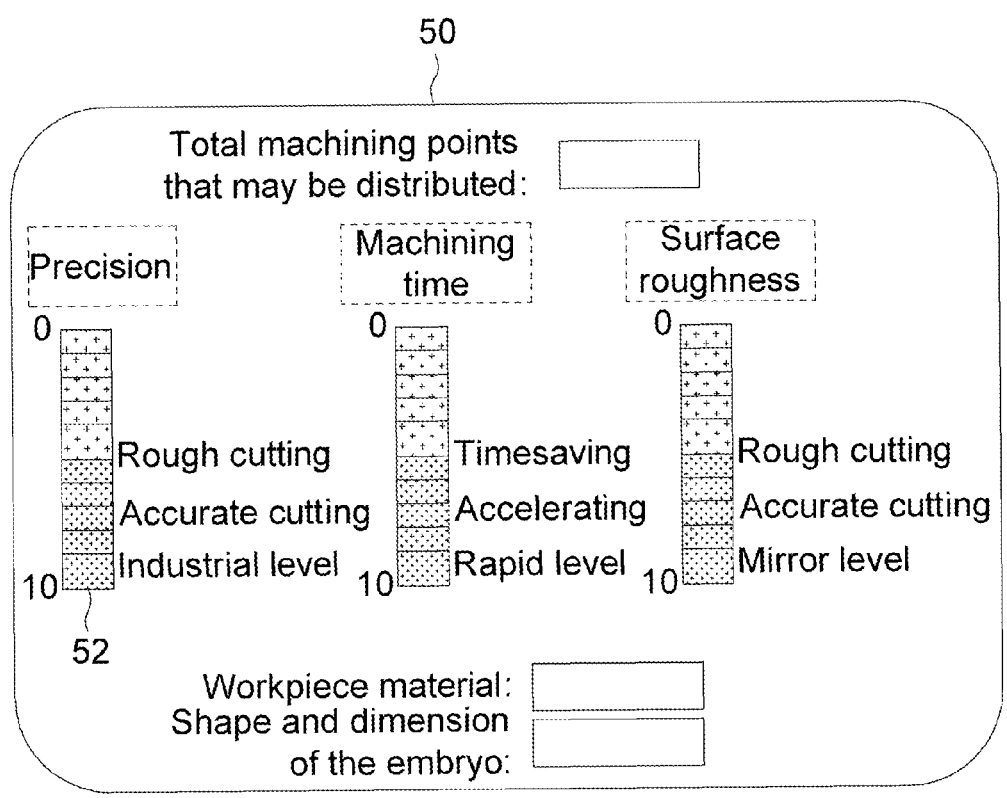
FIG. 5 shows another operation interface provided by the user interface.

FIG. 5 shows another operation interface provided by the user interface. In addition to the operation interface 40, the user interface 12 may also provide another operation interface 50. The difference between the operation interfaces 50 and 40 is that the operation interface 50 distributes the total machining points to the precision, machining time and surface roughness by a motion tuning bar.

The apparatus and method for tuning the control parameters according to the embodiment of the disclosure have many advantages, some of which will be listed in the following.

First, the technological threshold of the operator for using the machine tool is lowered.

Second, it is advantageous to the machining experience inheritance.

Third, the machining efficiency can be enhanced.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for tuning control parameters, the apparatus comprising:
   a parameter database for storing a plurality of control parameter sets, which is classified into a plurality of data groups respectively corresponding to a plurality of total machining points;
   a user interface for selecting one of the total machining points, for distributing the selected one of the total machining points to at least one machining item to generate distribution data of points, and further for inputting embryo data;
   a processing unit for selecting one of the control parameter sets corresponding to the distribution data of points and the embryo data from the parameter database; and
   a control unit for controlling a machine tool according to the corresponding one of the control parameter sets, wherein the machining item is classified into a first level, a second level and a third level, an upper limit of distributed points of the first level is equal to one half of the total machining points, an upper limit of distributed points of the second level is equal to one half of the total machining points minus 1, and an upper limit of distributed points of the third level is equal to 1.

2. The apparatus according to claim 1, wherein:
   the machining item includes a first item, a second item and a third item; and
   when the number of distributed points of the third level of the first item is equal to 1, the second level of the first item is automatically distributed as one half of the total machining points minus 1, and the first level of the first item is automatically distributed as one half of the total machining points.

3. The apparatus according to claim 1, wherein the machining item comprises a precision item, a machining time item and a surface roughness item.

4. The apparatus according to claim 1, wherein the embryo data comprise a data of workpiece material and a data of shape and dimension of the embryo.

5. A method for tuning control parameters in a machine tool, the method comprising the steps of:
   selecting a parameter database, which stores a plurality of control parameter sets classified into data groups respectively corresponding to a plurality of total machining points;
   selecting one of the total machining points;
   distributing the selected one of the total machining points to at least one machining item to generate distribution data of points, and inputting embryo data;
   selecting one of the control parameter sets corresponding to the distribution data of points and the embryo data from the parameter database; and
   controlling a machine tool according to the corresponding one of the control parameter sets, wherein the machining item is classified into a first level, a second level and a third level, an upper limit of distributed points of the first level is equal to one half of the total machining points, an upper limit of distributed points of the second level is equal to one half of the total machining points minus 1, and an upper limit of distributed points of the third level is equal to 1.

6. The method according to claim 5, wherein:
   the at least one machining item includes a first item, a second item and a third item; and
   when the number of distributed points of the third level of the first item is equal to 1, the second level of the first item is automatically distributed as one half of the total machining points minus 1, and the first level of the first item is automatically distributed as one half of the total machining points.

7. The method according to claim 5, wherein the machining item comprises a precision item, a machining time item and a surface roughness item.

8. The method according to claim 5, wherein the embryo data comprise a data of workpiece material and a data of shape and dimension of the embryo.

* * * * *